(12) United States Patent
Scott

(10) Patent No.: US 10,401,877 B2
(45) Date of Patent: Sep. 3, 2019

(54) FLOW WASHER ASSEMBLY

(71) Applicant: Nelson Irrigation Corporation, Walla Walla, WA (US)

(72) Inventor: Sean Scott, Walla Walla, WA (US)

(73) Assignee: NELSON IRRIGATION CORPORATION, Walla Walla, WA (US)

( * ) Notice: Subject to any disclaimer, the term of this patent is extended or adjusted under 35 U.S.C. 154(b) by 28 days.

(21) Appl. No.: 15/846,439

(22) Filed: Dec. 19, 2017

(65) Prior Publication Data

US 2019/0187729 A1 Jun. 20, 2019

(51) Int. Cl.
*G05D 7/00* (2006.01)
*G05D 7/01* (2006.01)
*B05B 1/30* (2006.01)
*B05B 1/32* (2006.01)
*F16K 27/02* (2006.01)

(52) U.S. Cl.
CPC .......... *G05D 7/012* (2013.01); *B05B 1/3006* (2013.01); *B05B 1/323* (2013.01); *F16K 27/0254* (2013.01)

(58) Field of Classification Search
CPC . F16L 55/027; G05D 7/012; Y10T 137/7888; Y10T 137/7869; Y10T 137/7668
USPC .......... 138/45, 46; 251/120; 137/454.6, 517, 137/601.18
See application file for complete search history.

(56) References Cited

U.S. PATENT DOCUMENTS

| | | | |
|---|---|---|---|
| 2,454,929 A | 11/1948 | Kempton | |
| 2,728,355 A * | 12/1955 | Dahl ...................... | G05D 7/012 138/45 |
| 2,891,578 A * | 6/1959 | Erickson ................ | D05B 27/18 138/45 |
| 2,899,979 A * | 8/1959 | Dahl et al. .............. | F16L 55/04 137/505 |
| 2,936,788 A * | 5/1960 | Dahl ....................... | G05D 7/012 138/45 |
| 2,936,790 A * | 5/1960 | Erickson ............... | F16K 31/404 138/45 |
| 2,939,487 A | 6/1960 | Fraser et al. | |

(Continued)

FOREIGN PATENT DOCUMENTS

WO    WO 84/03456    9/1984

OTHER PUBLICATIONS

European Extended Search Report dated May 24, 2019 issued in European Patent Application No. 18207864.2, 9 pp.

*Primary Examiner* — Patrick F Brinson
(74) *Attorney, Agent, or Firm* — Nixon & Vanderhye P.C.

(57) ABSTRACT

A flow washer assembly includes a housing with a channel for fluid flow, a seat positioned in the channel and including an upstream surface, and a washer press fit in the channel and engaging the upstream surface of the seat. The washer may be provided with a central opening that is sized according to predefined flow characteristics. An outside diameter of the washer at least adjacent an upstream end may be greater than an inside diameter of the channel such that the washer assumes a flexed orientation when press fit into the channel. Since the washer is pre-deflected, it will deflect further as inlet fluid pressure increases, effectively keeping the fluid flow rate relatively constant. The "pre-flexing" of the washer eliminates a spike in flow rate that occurs with conventional flow washer assemblies.

19 Claims, 3 Drawing Sheets

(56) References Cited

U.S. PATENT DOCUMENTS

| | | | | |
|---|---|---|---|---|
| 3,138,177 A | * | 6/1964 | Cutler | A47L 15/4217 |
| | | | | 137/504 |
| 3,768,507 A | * | 10/1973 | Dicken, Jr. | D06F 33/02 |
| | | | | 137/504 |
| 3,995,664 A | | 12/1976 | Nelson | |
| 4,266,576 A | * | 5/1981 | Bradford | F16L 37/025 |
| | | | | 138/40 |
| 4,609,014 A | | 9/1986 | Jurjevic et al. | |
| 4,883,093 A | * | 11/1989 | Miles | F16L 55/027 |
| | | | | 138/45 |
| 5,027,861 A | | 7/1991 | Gute | |
| 5,154,394 A | * | 10/1992 | DuHack | G05D 7/0635 |
| | | | | 138/41 |
| 5,209,265 A | | 5/1993 | Taguri et al. | |
| 5,904,334 A | | 5/1999 | Grunert et al. | |
| 5,971,297 A | | 10/1999 | Sesser | |
| 6,739,351 B1 | * | 5/2004 | Rosser | C02F 1/688 |
| | | | | 137/268 |
| 7,225,829 B2 | | 6/2007 | Bailey | |

* cited by examiner

FLOW WASHER ASSEMBLY

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND

The invention relates to a flow washer assembly and, more particularly, to a flow washer assembly that regulates flow of fluid with a dynamically changing orifice diameter to keep the flow rate of fluid constant within a given pressure range. The assembly endeavors to eliminate a spike in flow rate that occurs with conventional flow washer assemblies.

A common problem with this type of flow control device is a "spike" in the flow rate as the inlet pressure is increased from zero psi to the operating range. As the inlet pressure increases, so does the flow rate through the device, until such time as the inlet pressure is great enough to cause a deflection of the elastomeric washer, which in turn causes a reduction in washer orifice diameter, resulting in a flow rate reduction. The flow spike occurs at the point where the pressure is great enough to cause an "overflow" or "spike" condition yet not great enough to cause a deflection in the elastomeric washer.

In an agricultural sprinkler application, this "spike" in the flow rate can create a significant problem. When the flow "spike" in the individual sprinklers is multiplied by the number of sprinklers in a given system, the amount of increased water flow is substantial. The water pump that pressurizes the system is usually sized so that it supplies just enough water flow to pressurize a given number of sprinklers at a certain maximum flow rate. When all the sprinklers in a system experience a "spike" in flow rate at the same time, the water pump cannot produce enough flow to adequately pressurize the system. When this situation occurs, the flow control devices at each individual sprinkler will never get enough pressure to regulate the flow rate. As a consequence, the system will never get to its optimal operating pressure, and the individual sprinklers will not function as designed.

BRIEF SUMMARY

It would be desirable to eliminate the flow "overflow" or "spike" condition of the existing devices. Exemplary embodiments according to the present disclosure incorporate features that may contribute to eliminating the flow "spike" condition. For example, the flow washer may include an outside diameter ring that is cooperable with the housing to "pre-flex" the washer, which will eliminate the flow "spike" condition. Alternatively or additionally, the washer may include pre-load protrusions or bumps that interact with a retainer washer to effect pre-flexing of the washer. Still further, a seat adjacent to which the flow washer is placed may include an upstream surface that facilitates pre-flexing of the washer.

In an exemplary embodiment, a flow washer assembly includes a housing with a channel for fluid flow, a seat positioned in the channel and including an upstream surface, and a washer that is press fit into the channel and engaging the upstream surface of the seat. The washer may be provided with a central opening that is sized according to predefined flow characteristics. An outside diameter of the washer that is at least adjacent to an upstream end may be greater than an inside diameter of the channel such that the washer assumes a flexed orientation when it is press fit into the channel.

The outside diameter of the washer may be tapered across its thickness from a maximum diameter at the upstream end to a minimum diameter at a downstream end such that the washer may be part-conical shaped. The upstream surface may be shaped to receive the washer in the flexed orientation. For example, the upstream surface of the seat may be concave. The channel may include a shoulder, and the seat may be press fit in the channel adjacent to the shoulder. A retainer may be positioned in the channel and may be engaged with the washer, where the washer may be sandwiched between the seat and the retainer. In this context, the washer may include a plurality of protrusions on a side thereof facing the retainer, where the retainer may be positioned in engagement with the protrusions to deflect the washer toward the flexed orientation. In some embodiments, the protrusions are disposed inside a perimeter of the washer surrounding the central opening.

In another exemplary embodiment, a flow washer assembly includes a housing with a channel for fluid flow, a seat positioned in the channel and including an upstream surface, a washer press fit in the channel and engaging the upstream surface of the seat on a downstream side, and a retainer positioned in the channel and engaging the washer such that the washer is sandwiched between the seat and the retainer. The washer may include a plurality of protrusions on an upstream side and a central opening that is sized according to predefined flow characteristics. The retainer may be positioned in engagement with the protrusions to deflect the washer toward a flexed orientation.

In yet another exemplary embodiment, a method of installing a washer assembly into a housing with a channel for fluid flow includes the steps of positioning a seat in the channel, the seat having an upstream surface; and press fitting the washer in the channel until the washer assumes a flexed orientation in engagement with the upstream surface of the seat.

In still another exemplary embodiment, a flow washer includes a plurality of protrusions on an upstream side and a central opening that is sized according to predefined flow characteristics. An outside diameter of the washer that is at least adjacent to an upstream end is greater than the outside diameter adjacent to a downstream end. The outside diameter of the washer may be tapered across its thickness from a maximum diameter at the upstream end to a minimum diameter at the downstream end such that the washer is part-conical shaped.

BRIEF DESCRIPTION OF THE DRAWINGS

These and other aspects and advantages will be described in detail with reference to the accompanying drawings, in which.

DETAILED DESCRIPTION

Figure 1:
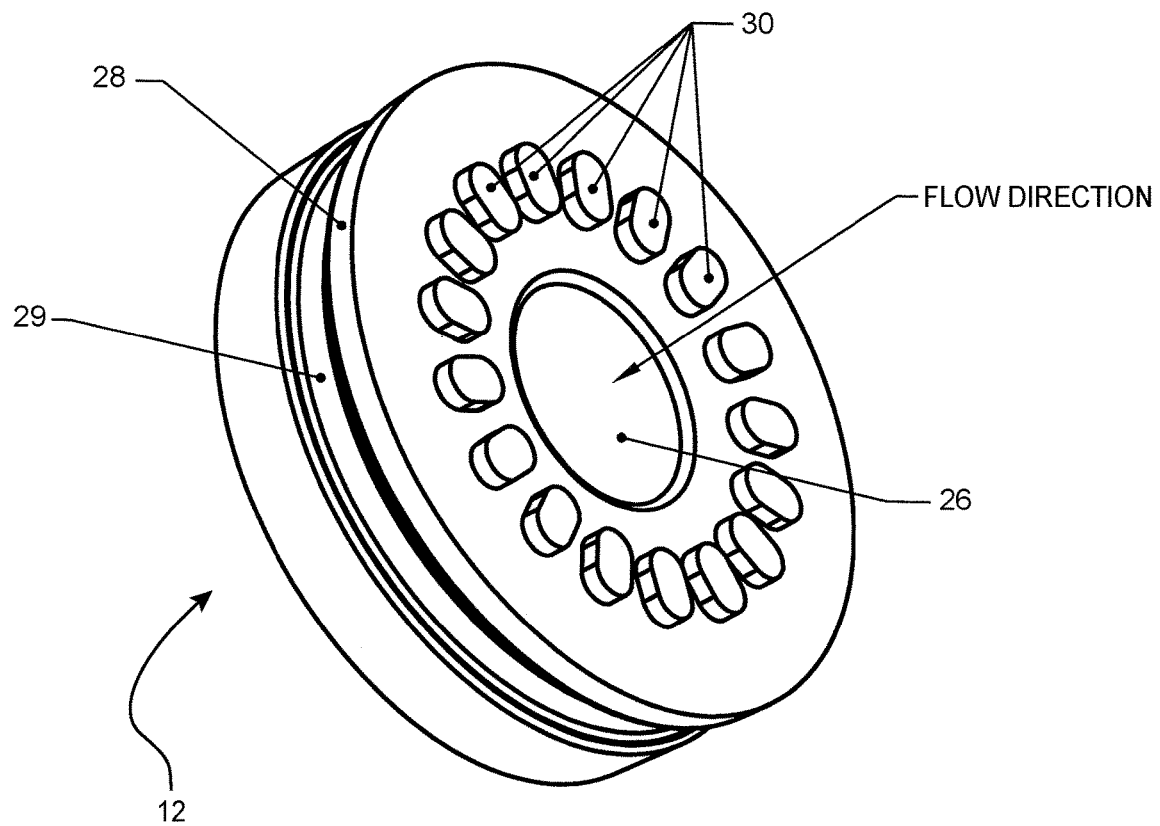
FIG. 1 is a perspective view of an exemplary flow washer according to the described embodiments.
Figure 2:
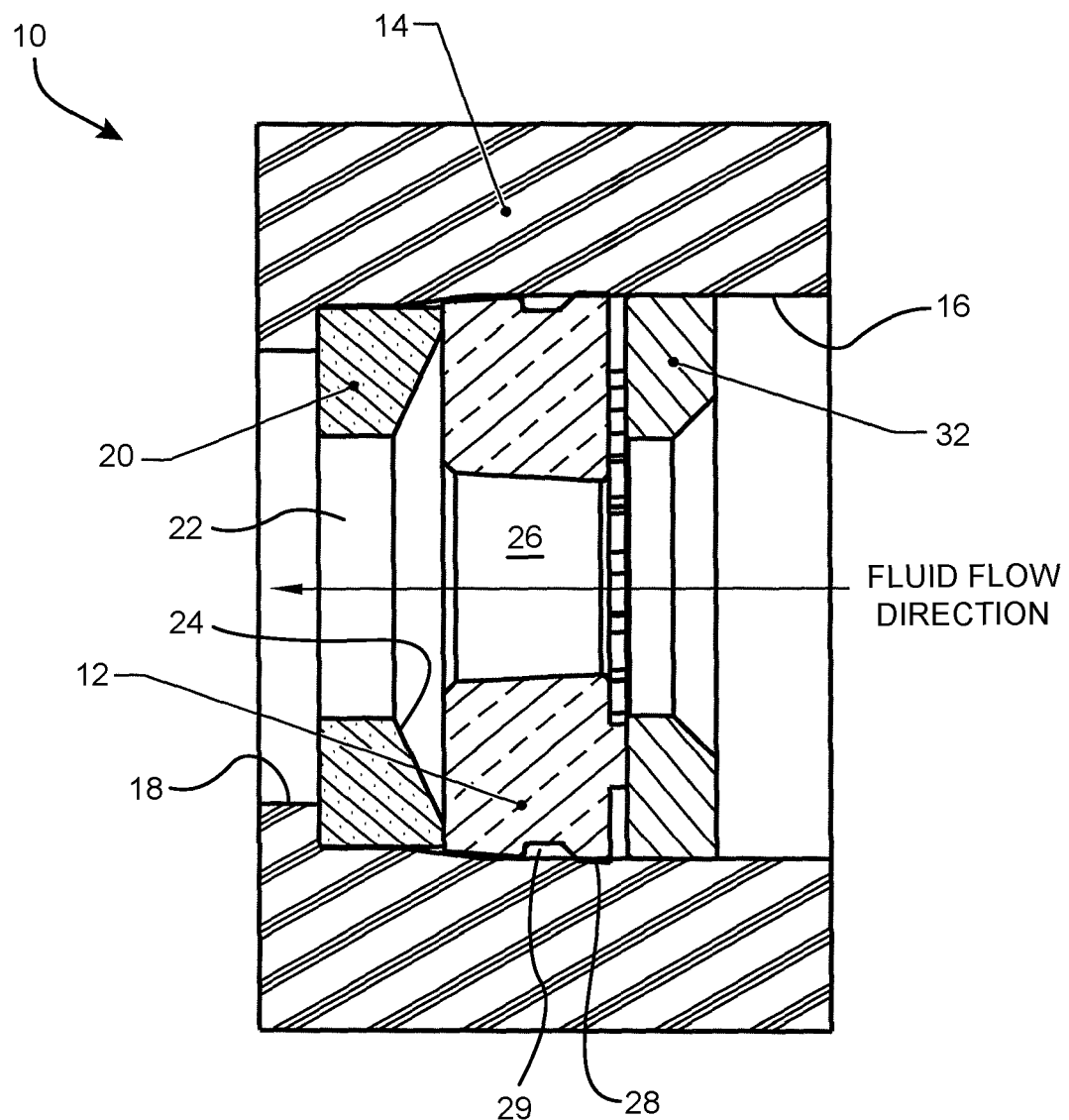
FIG. 2 is a sectional view of the flow washer assembly.

FIG. 1 is a perspective view of a flow washer 12 forming part of the flow washer assembly 10 shown in FIG. 2. The flow washer assembly 10 includes a housing 14 with a channel 16 for fluid flow. The housing 14 may include a shoulder 18 in the channel 16 for receiving a seat washer or seat 20. In an exemplary embodiment, the seat 20 is press fit in the channel 16 adjacent the shoulder 18.

The seat 20 includes a central opening 22 and an upstream surface 24. The upstream surface 24 may generally be concave as shown in FIG. 2. That is, the upstream surface 24 may be provided with an overall concave configuration with tapered or curved sides or the like.

The washer 12 is press fit in the channel 16 and engages at least the outermost portions of the upstream surface 24 of the seat 20. The washer 12 includes a central opening 26 that is sized according to predefined flow characteristics. In some embodiments, the washer 12 may include an outside diameter section or ring 28 at least adjacent an upstream end of the washer 12 that is greater than an inside diameter of the channel 16. As such, as the washer 12 is press fit into the channel 16 into engagement with the upstream surface 24 of the seat 20, the outside diameter section or ring 28 of the washer 12 intersects the inside diameter of the channel 16. The washer 12 is preferably constructed of an elastomeric material, and the engagement of the outside diameter section or ring 28 with the inside diameter of the channel 16 effects a flexed orientation of the washer 12 in the channel 16. That is, due to the interference between the outside diameter 28 of the washer 12 and the inside diameter of the channel 16, the washer will deflect or bend in the direction of water flow. The washer 12 may additionally include a recess 29 adjacent the outside diameter section 28 that allows the ring to flex more readily during installation in the channel 16. The concave shape of the seat inside surface 24 also serves to facilitate the flexed orientation of the washer 12 in the channel 16.

Figure 3:
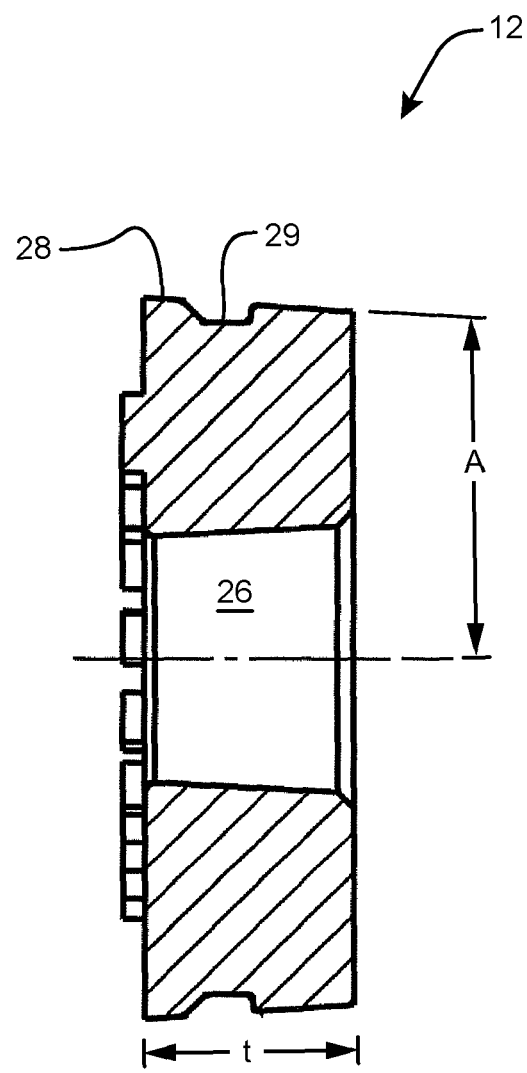
FIG. 3 is a side-sectional view of the flow washer.

With reference to FIG. 3, the outside diameter of the washer 12 may be tapered across its thickness t from a maximum diameter at the upstream end to a minimum diameter at the downstream end as shown by arrow A. As shown in FIG. 3, the washer 12 may thus be part-conical shaped across its thickness t.

The washer 12 may additionally be provided with a plurality of protrusions 30 on an upstream side of the washer 12. The protrusions 30 are generally disposed inside a perimeter of the washer 12 surrounding the central opening 26 as shown in FIG. 1. The protrusions 30 are cooperable with a retainer washer or retainer 32 that may be positioned in the channel 16 and engaged with an upstream side of the washer 12. As shown in FIG. 2, with the retainer 32 installed in the channel 16, the washer 12 is sandwiched between the seat 20 and the retainer 32. When installed, the retainer 32 engages the protrusions 30 on the washer 12 to deflect the washer 12 toward the flexed orientation.

In some embodiments, the flow washer assembly 10 may be assembled with the seat 20 and washer 12 without the retainer 32. In an alternative variation, the flow washer assembly may include the retainer 32 without the seat 20 or may include both the seat 20 and retainer 32 as shown in FIG. 2.

In use, fluid flows through the flow washer assembly 10, and the flow of fluid is restricted by the orifice or central opening 26 of the washer 12. A diameter of the central opening 26 changes with inlet fluid pressure. That is, as the inlet fluid pressure increases, the diameter of the central opening 26 is reduced in size, which regulates the flow of fluid through the assembly 10. This dynamically changing orifice diameter does so in such a manner as to keep the flow rate of fluid through the device relatively constant within a given pressure range.

When the device is assembled, there is a significant amount of interference between the inside diameter of the channel 16 and the outside diameter section or ring 28 of the washer 12. This interference causes the washer 12 to flex and the inlet side of the washer 12 to become concave. The concave shape of the seat 20 facilitates flexion of the washer 12 in the flow direction. This pre-flexing of the washer 12 causes the central opening 26 to be reduced in diameter, which in turn reduces the fluid flow through the device.

The protrusions 30 also contribute to the pre-flexing of the washer 12 when used with the retainer 32. As noted, the washer 12 is sandwiched between the seat 20 and the retainer 32. When the retainer 32 is press fit into the channel 16 of the housing 14, the retainer 32 engages the protrusions 30 on the washer 12. This engagement causes a deflection of the washer 12, which further causes the inlet side of the washer 12 to become concave in shape. This concave shape translates to a reduction in the central opening 26 size even at zero inlet pressure. The reduced central opening 26 reduces the fluid flow through the device.

Since the washer 12 is pre-deflected by the engagement between its outside diameter and the inside diameter of the channel 16 of the housing and/or by the retainer 32 engaging the protrusions 30 on the washer 12, the washer 12 continues to deflect further as inlet fluid pressure increases, effectively keeping the fluid flow rate relatively constant across a given pressure range. The mechanical "pre-flexing" of the washer eliminates the spike in flow rate through the device that occurs with existing assemblies. Moreover, the seat is shaped in such a manner that it allows the washer to further deform when fluid pressure is applied to the inlet.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A flow washer assembly comprising:
   a housing with a channel for fluid flow;
   a seat positioned in the channel and including an upstream surface; and
   a washer that is press fit into the channel and engaging the upstream surface of the seat, the washer including a central opening that is sized according to predefined flow characteristics,
   wherein an outside diameter of the washer that is at least adjacent to an upstream end is greater than an inside diameter of the channel such that the washer assumes a flexed orientation by engagement of the outside diameter of the washer with the inside diameter of the channel when the washer is press fit into the channel.

2. A flow washer assembly comprising:
   a housing with a channel for fluid flow;
   a seat positioned in the channel and including an upstream surface; and
   a washer that is press fit into the channel and engaging the upstream surface of the seat, the washer including a central opening that is sized according to predefined flow characteristics,
   wherein an outside diameter of the washer that is at least adjacent to an upstream end is greater than an inside diameter of the channel such that the washer assumes a flexed orientation when it is press fit into the channel, and wherein the outside diameter of the washer is tapered across its thickness from a maximum diameter at the upstream end to a minimum diameter at a downstream end such that the washer is part-conical shaped.

3. A flow washer assembly according to claim 1, wherein the upstream surface is shaped to receive the washer in the flexed orientation.

4. A flow washer assembly according to claim 3, wherein the upstream surface of the seat is concave.

5. A flow washer assembly according to claim 1, wherein the channel comprises a shoulder, and wherein the seat is press fit in the channel adjacent to the shoulder.

6. A flow washer assembly according to claim 1, further comprising a retainer positioned in the channel and engaging the washer, wherein the washer is sandwiched between the seat and the retainer.

7. A flow washer assembly according to claim 6, wherein the washer comprises a plurality of protrusions on a side thereof facing the retainer, wherein the retainer is positioned in engagement with the protrusions to deflect the washer toward the flexed orientation.

8. A flow washer assembly according to claim 7, wherein the protrusions are disposed inside a perimeter of the washer surrounding the central opening.

9. A flow washer assembly comprising:
a housing with a channel for fluid flow;
a seat positioned in the channel and including an upstream surface;
a washer press fit in the channel and engaging the upstream surface of the seat on a downstream side, the washer including a plurality of protrusions on an upstream side and a central opening that is sized according to predefined flow characteristics; and
a retainer positioned in the channel and engaging the washer such that the washer is sandwiched between the seat and the retainer, wherein the retainer is positioned in engagement with the protrusions to deflect the washer toward a flexed orientation in a fluid flow direction.

10. A flow washer assembly according to claim 9, wherein an outside diameter of the washer that is at least adjacent to an upstream end is greater than an inside diameter of the channel such that the washer assumes the flexed orientation when press fit into the channel.

11. A flow washer assembly according to claim 10, wherein the outside diameter of the washer is tapered across its thickness from a maximum diameter at the upstream end to a minimum diameter at a downstream end such that the washer is part-conical shaped.

12. A flow washer assembly according to claim 9, wherein the upstream surface is shaped to receive the washer in the flexed orientation.

13. A flow washer assembly according to claim 12, wherein the upstream surface of the seat is concave.

14. A flow washer assembly according to claim 9, wherein the channel comprises a shoulder, and wherein the seat is press fit in the channel adjacent the shoulder.

15. A method of installing a washer assembly into a housing with a channel for fluid flow, the washer assembly including a washer with a central opening that is sized according to predefined flow characteristics, the method comprising:
positioning a seat in the channel, the seat having an upstream surface; and
press fitting the washer in the channel until the washer assumes a flexed orientation in a fluid flow direction in engagement with the upstream surface of the seat.

16. A method according to claim 15, further comprising positioning a retainer in the channel into engagement with the washer such that the washer is sandwiched between the seat and the retainer.

17. A method according to claim 16, wherein the washer comprises a plurality of protrusions on a side thereof facing the retainer, and wherein the positioning step comprises positioning the retainer in engagement with the protrusions to deflect the washer toward the flexed orientation.

18. A method according to claim 15, wherein the upstream surface of the seat is concave, the method further comprising deflecting the washer into the concave upstream surface of the seat.

19. A flow washer comprising a plurality of protrusions on an upstream side and a central opening that is sized according to predefined flow characteristics, wherein an outside diameter of the washer that is at least adjacent to an upstream end is greater than the outside diameter adjacent to a downstream end, and wherein the outside diameter of the washer is tapered across its thickness from a maximum diameter at the upstream end to a minimum diameter at the downstream end such that the washer is part-conical shaped.

\* \* \* \* \*